United States Patent
Ananda et al.

(10) Patent No.: US 12,355,683 B2
(45) Date of Patent: Jul. 8, 2025

(54) TECHNIQUES TO PERFORM ENERGY SCANS IN NEW RADIO

(71) Applicant: QUALCOMM Incorporated, San Diego, CA (US)

(72) Inventors: Raghavendra Shyam Ananda, Hyderabad (IN); Srikanth Menon, Hyderabad (IN); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/508,864

(22) Filed: Oct. 22, 2021

(65) Prior Publication Data

US 2023/0127220 A1      Apr. 27, 2023

(51) Int. Cl.
| | |
|---|---|
| H04L 5/00 | (2006.01) |
| H04L 27/26 | (2006.01) |
| H04W 76/10 | (2018.01) |

(52) U.S. Cl.
CPC .......... H04L 5/001 (2013.01); H04L 27/2665 (2013.01); H04W 76/10 (2018.02)

(58) Field of Classification Search
CPC . H04L 5/001; H04L 27/2665; H04L 27/2602; H04L 27/2663; H04W 76/10; Y02D 30/70; H04J 11/0086
See application file for complete search history.

(56) References Cited

U.S. PATENT DOCUMENTS

| | | | |
|---|---|---|---|
| 11,218,976 B1 * | 1/2022 | Lane | H04B 1/04 |
| 2010/0329683 A1 * | 12/2010 | Liu | H04B 10/2513 |
| | | | 398/81 |
| 2012/0266008 A1 * | 10/2012 | Coteus | G06F 1/10 |
| | | | 713/400 |

(Continued)

FOREIGN PATENT DOCUMENTS

CN     113473522 A     10/2021

OTHER PUBLICATIONS

International Search Report and Written Opinion—PCT/US2022/076829—ISA/EPO—Jan. 2, 2023 (2105849WO).

(Continued)

*Primary Examiner* — Will W Lin
(74) *Attorney, Agent, or Firm* — Holland & Hart LLP

(57) ABSTRACT

Methods, systems, and devices for wireless communications are described. Aspects of the present disclosure describe a quick scanning method to reject global synchronization channel numbers (GSCNs) that do not include a synchronization signal block (SSB). The quick scanning method utilizes down-sampling techniques to reduce complexity associated with scanning many GSCNs for an SSB. For example, a user equipment (UE) may down-sample a signal to obtain a coarse signal subset (e.g., by using coarse bin sizes, sampling a portion of symbols). The UE may perform a fast Fourier Transform, along with one or more data processing techniques, to obtain a spectrogram corresponding to the signal. While the spectrogram may represent the signal in the frequency domain with reduced resolution, and may include energy information corresponding to different frequencies. The UE may utilize the spectrogram to examine frequencies corresponding to GSCNs to detect if an SSB is present.

30 Claims, 11 Drawing Sheets

(56) References Cited

U.S. PATENT DOCUMENTS

| | | | | |
|---|---|---|---|---|
| 2018/0337755 | A1* | 11/2018 | John Wilson | H04W 56/0015 |
| 2020/0146041 | A1* | 5/2020 | Kim | H04L 5/0053 |
| 2020/0252822 | A1* | 8/2020 | Kim | H04L 5/0048 |
| 2020/0374096 | A1* | 11/2020 | Duan | H04B 7/063 |
| 2022/0124786 | A1* | 4/2022 | Mukherjee | H04W 74/0833 |
| 2022/0338140 | A1* | 10/2022 | Zhang | H04L 5/0092 |
| 2023/0413290 | A1* | 12/2023 | Hou | H04L 5/001 |

OTHER PUBLICATIONS

Wang D., et al., "A Novel PSS Timing Synchronization Algorithm for Cell Search in 5G NR System", IEEE Access, IEEE, USA, vol. 9, Jan. 1, 2021, pp. 5870-5880, XP011830671, section III. B. figure 5 p. 5871, left-hand column, paragraph 2. full.

* cited by examiner

TECHNIQUES TO PERFORM ENERGY SCANS IN NEW RADIO

TECHNICAL FIELD

The following relates to wireless communications, including techniques to perform energy scans in New Radio (NR).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Components within a wireless communication system may be coupled (for example, operatively, communicatively, functionally, electronically, and/or electrically) to each other. A UE may perform power scans to detect resources and establish communications with one or more wireless devices. Techniques for power scanning may be improved.

SUMMARY

The described techniques relate to improved methods, systems, devices, and apparatuses that support techniques to perform energy scans in New Radio (NR). Generally, the described techniques provide for a quick scanning method to reject global synchronization channel numbers (GSCNs) that do not include a synchronization signal block (SSB). The quick scanning method utilizes one or more down-sampling techniques to reduce complexity associated with scanning many GSCNs for an SSB. For example, a user equipment (UE) may down-sample a signal to obtain a coarse signal subset (e.g., by using coarse bin sizes, sampling a portion of symbols). The UE may receive a downlink signal including an SSB spanning across a set of symbol periods in a time domain and a set of subcarriers in a frequency domain. The UE may analyze a portion of each symbol period of the set of symbol periods in the time domain across a subset of the set of subcarriers in the frequency domain. For instance, the UE may perform a fast Fourier Transform, along with one or more data processing techniques, to obtain a spectrogram corresponding to the signal. The spectrogram may represent the signal in the frequency domain with reduced resolution (e.g., due to the down-sampling), and may include energy information corresponding to different frequencies. The UE may utilize the spectrogram to examine frequencies corresponding to GSCNs to detect if an SSB is present (e.g., by measuring energy associated with the frequencies). The UE may identify an energy pattern corresponding to the SSB and may establish a connection with a base station based on the identified energy pattern.

A method for wireless communication at a user equipment (UE) is described. The method may include receiving a downlink signal including an SSB at a frequency corresponding to a global synchronization channel number, the SSB spanning across a set of symbol periods in time domain and a set of subcarriers in frequency domain, analyzing a portion of each symbol period of the set of symbol periods in the time domain across a subset of the set of subcarriers in the frequency domain, identifying an energy pattern corresponding to the SSB based on the analyzing, and establishing a connection with a base station based on the identified energy pattern.

An apparatus for wireless communication at a UE is described. The apparatus may include at least one processor, memory coupled (e.g., operatively, communicatively, functionally, electronically, or electrically, etc.) to the at least one processor, and the memory storing instructions. The instructions may be executable by the at least one processor to cause the apparatus to receive a downlink signal including an SSB at a frequency corresponding to a global synchronization channel number, the SSB spanning across a set of symbol periods in time domain and a set of subcarriers in frequency domain, analyze a portion of each symbol period of the set of symbol periods in the time domain across a subset of the set of subcarriers in the frequency domain, identify an energy pattern corresponding to the SSB based on the analyzing, and establish a connection with a base station based on the identified energy pattern.

Another apparatus for wireless communication at a UE is described. The apparatus may include means for receiving a downlink signal including an SSB at a frequency corresponding to a global synchronization channel number, the SSB spanning across a set of symbol periods in time domain and a set of subcarriers in frequency domain, means for analyzing a portion of each symbol period of the set of symbol periods in the time domain across a subset of the set of subcarriers in the frequency domain, means for identifying an energy pattern corresponding to the SSB based on the analyzing, and means for establishing a connection with a base station based on the identified energy pattern.

A non-transitory computer-readable medium storing code for wireless communication at a UE is described. The code may include instructions executable by at least one processor to receive a downlink signal including an SSB at a frequency corresponding to a global synchronization channel number, the SSB spanning across a set of symbol periods in time domain and a set of subcarriers in frequency domain, analyze a portion of each symbol period of the set of symbol periods in the time domain across a subset of the set of subcarriers in the frequency domain, identify an energy pattern corresponding to the SSB based on the analyzing, and establish a connection with a base station based on the identified energy pattern.

Some examples of the method, apparatuses, and non-transitory computer-readable medium described herein may further include operations, features, means, or instructions for receiving the downlink signal including a first set of multiple signal samples at a first frequency and buffering a second set of multiple signal samples, where the first set of multiple signal samples may be greater than the second set of multiple signal samples.

Some examples of the method, apparatuses, and non-transitory computer-readable medium described herein may further include operations, features, means, or instructions for performing a fast Fourier transform of the second set of multiple signal samples to identify a set of frequency bins and computing an energy for each frequency bin of the set of frequency bins, where identifying the energy pattern corresponding to the SSB may be based on computing the energy for each frequency bin.

Some examples of the method, apparatuses, and non-transitory computer-readable medium described herein may further include operations, features, means, or instructions for performing an average across the time domain to compute the energy in each frequency bin of the set of frequency bins over a symbol period of the set of symbol periods.

In some examples of the method, apparatuses, and non-transitory computer-readable medium described herein, each frequency bin of the set of frequency bins include the subset of the set of subcarriers. In some examples of the method, apparatuses, and non-transitory computer-readable medium described herein, each frequency bin of the set of frequency bins may be disjoint in time.

Some examples of the method, apparatuses, and non-transitory computer-readable medium described herein may further include operations, features, means, or instructions for performing a fast Fourier transform of the second set of multiple signal samples to identify a set of frequency bins, identifying one or more frequency bins corresponding to a center frequency and bandwidth for the global synchronization channel number, and determining that an energy for a first frequency bin may be less that an energy for a second frequency bin, where identifying the energy pattern corresponding to the SSB may be based on determining the energy for the first frequency bin and an energy for the second frequency bin.

In some examples of the method, apparatuses, and non-transitory computer-readable medium described herein, the second frequency bin corresponds to a symbol period of the set of symbol periods. In some examples of the method, apparatuses, and non-transitory computer-readable medium described herein, the energy pattern corresponding to the SSB spans across for consecutive symbol periods. In some examples of the method, apparatuses, and non-transitory computer-readable medium described herein, the symbol period includes an orthogonal frequency-division multiplexing symbol and the portion of each symbol period includes an eighth of the orthogonal frequency-division multiplexing symbol.

DETAILED DESCRIPTION

In wireless communications systems supporting New Radio (NR) technologies, a user equipment (UE) may perform power scans to detect resources and establish communications with one or more wireless devices. For example, during initial acquisition, a UE may scan certain frequency and time resources for NR broadcast signals that carry synchronization information. The frequency and time resources of the NR broadcasts may be represented by global synchronization channel numbers (GSCN), where the GSCNs have a one-to-one correspondence with frequencies carrying synchronization information. However, a GSCN may not carry a synchronization signal block (SSB). As such, when performing power scanning to obtain resources for communication operations, the UE may iterate through many GSCNs to locate an SSB, which may consume non-trivial amounts of network and computational resources, as well as increase latency at the UE.

Aspects of the present disclosure describe a quick scanning method to reject GSCNs that do not include a synchronization signal block (SSB). The quick scanning method utilizes one or more down-sampling techniques to reduce complexity associated with scanning many GSCNs for an SSB. For example, a UE may down-sample a signal to obtain a coarse signal subset (e.g., by using coarse bin sizes, sampling a portion of symbols). The UE may perform a fast Fourier Transform, along with one or more data processing techniques, to obtain a spectrogram corresponding to the signal. While the spectrogram may represent the signal in the frequency domain with reduced resolution (e.g., due to the down-sampling), the spectrogram may still include energy information corresponding to different frequencies.

The UE may utilize the spectrogram to examine frequencies corresponding to GSCNs to detect if an SSB is present (e.g., by measuring energy associated with the frequencies). In some cases, the UE may compare energies within the spectrogram to energy patterns associated with SSBs (e.g., via correlation, machine learning techniques) to determine if a given GSCN carries an SSB. However, since the spectrogram was generated by a down-sampled version of the signal, the computational burden associated with searching for SSBs may be reduced. Thus, the UE may detect SSBs within frequencies corresponding to GSCNs while consuming less computational resources and reducing latency.

Aspects of the disclosure are initially described in the context of wireless communications systems. Aspects of the disclosure are further illustrated by and described with reference to a GSCN pattern, an energy pattern, and a process flow. Aspects of the disclosure are further illustrated by and described with reference to apparatus diagrams, system diagrams, and flowcharts that relate to techniques to perform energy scans in NR.

Figure 1:
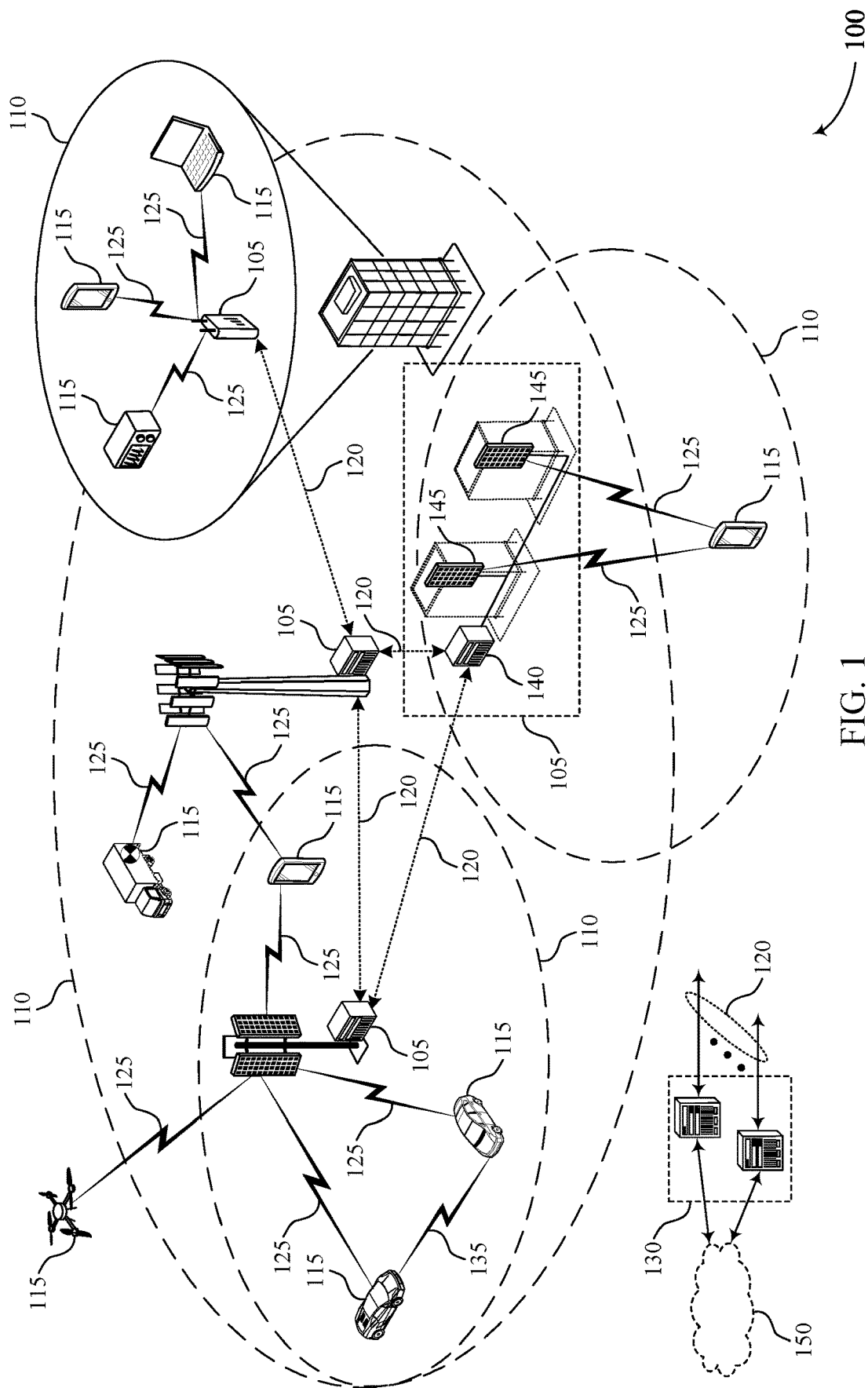
FIG. 1 illustrates an example of a wireless communications system that supports techniques to perform energy scans in New Radio (NR) in accordance with aspects of the present disclosure.

FIG. 1 illustrates an example of a wireless communications system 100 that supports techniques to perform energy scans in NR in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems (e.g., NR), a UE 115 may determine one or more resources to utilize for communications with a base station 105 (e.g., during initial acquisition). In some cases, the UE 115 may perform a full frequency scan (FFS) to search for a primary synchronization signal (PSS) at frequencies corresponding to GSCNs to determine resources from the base station 105 to utilize for subsequent communications. For example, during initial acquisition, the UE 115 may search for symbols within SSBs corresponding to GSCNs, including PSS, secondary synchronization signals (SSS), and physical broadcast channels (PBCH) with an associated demodulation reference signal (DMRS). Additionally, during initial acquisition, the UE 115 may assume SSBs correspond to an associated periodicity (e.g., 20 milliseconds (ms)) centered over valid GSCNs.

In some cases, however, processing NR SSBs may consume more resources due to high bandwidth (e.g., compared to LTE, e-MTC, NB-IoT). For example, FFS may be associated with limited parallel processing capabilities for processing GSCNs. Additionally, NR may not transmit pilots (e.g., cell-specific reference signal (CRS)), and received signal strength indicator (RSSI) scans may not be reliable. Further, devices enabled for worldwide deployment may perform scans over thousands of GSCNs upon wakeup. Scans over thousands of GSCNs may be associated with long scan times, which may not be desirable from a user point-of-view, application point-of-view, or both. To improve the scanning times, aspects depicted herein provide for a quick method for rejecting GSCNs not including SSBs are desirable to improve overall efficiency at the UE 115.

Aspects of the present disclosure describe a quick scanning method to reject GSCNs that do not include an SSB. The quick scanning method utilizes one or more down-sampling techniques to reduce complexity associated with scanning many GSCNs for an SSB. The UE 115 may utilize a spectrogram to examine frequencies corresponding to GSCNs to detect if an SSB is present (e.g., by measuring energy associated with the frequencies). However, since the spectrogram was generated by a down-sampled version of the signal, the computational burden associated with searching for SSBs may be reduced. Thus, the UE may detect SSBs within frequencies corresponding to GSCNs while consuming less computational resources and reducing latency.

Figure 2:
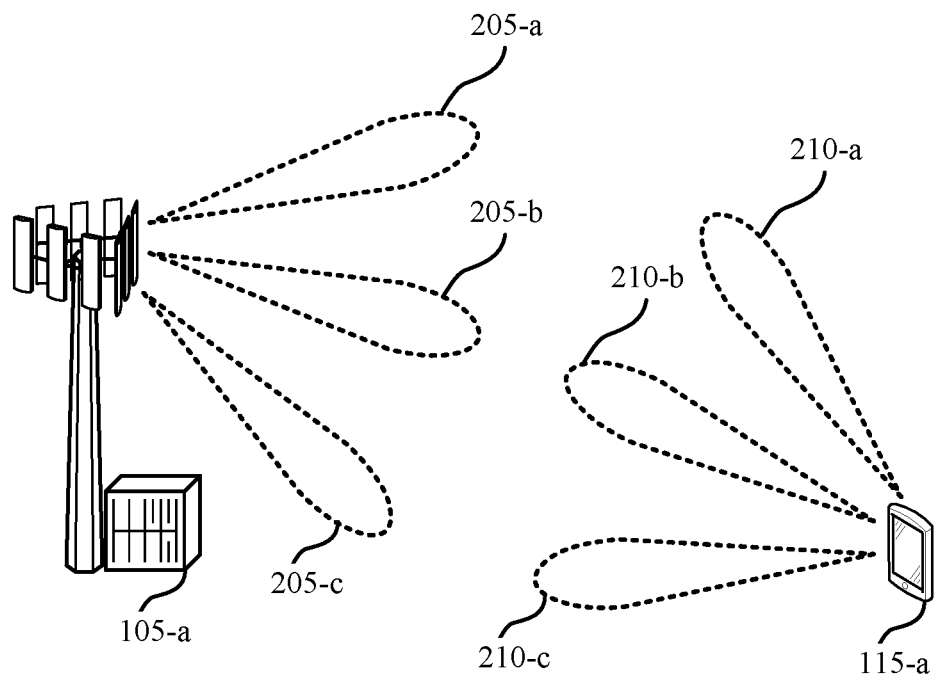
FIG. 2 illustrates an example of a wireless communications system that supports techniques to perform energy scans in NR in accordance with aspects of the present disclosure.

FIG. 2 illustrates an example of a wireless communications system 200 that supports techniques to perform energy scans in NR in accordance with aspects of the present disclosure. The wireless communications system 200 may implement or be implemented by one or more aspects of the wireless communications system 100. For example, the wireless communications system 200 may include a UE 115-a and a base station 105-a, which may be examples of the UE 115 and the base station 105 as described with reference to FIG. 1. In some cases, a geographic coverage area served by the base station 105-a may include the UE 115-a. In some cases, the UE 115-a may be configured to support improved communications by implementing techniques for performing energy scans. For example, the UE 115-a may use a reduced set of viable beams to establish a connection with the base station 105-a. It should be noted that, while examples are discussed below, any number of devices and device types may be used to accomplish implementations described in the present disclosure.

A base station 105-a may be configured with multiple antennas, which may be used for directional or beamformed transmissions (e.g., beamformed communication beams 205). Similarly, the UE 115-a may be configured with multiple antennas, which may be used for directional or beamformed transmissions (e.g., beamformed communication beams 210). In some examples, the UE 115-a and the base station 105-a may participate in a beam sweep procedure. As illustrated, the base station 105-a and the UE 115-a may transmit a number of beamformed communication beams 205, 210 in different directions within a coverage area.

In some examples, the base station 105-a and the UE 115-a may repeat the beam sweep pattern over different communication beams 205 and communications beams 210 in an order which may be determined according to a given beam sweep pattern. The base station 105-a and the UE 115-a may have at least one active communication beam pair for wireless communications. The base station 105-a may communicate with the UE 115-a on an active communication beam 205, and the UE 115-a may communicate with the base station 105-a on an active communication beam 210. The active communication beam may be used for transmitting transmission such as data and control information. The active communication beam may be a downlink receive beam and an uplink transmit beam for the UE 115-a, or a downlink transmit beam and an uplink receive beam for the base station 105-a.

In some examples, the base station 105-a and the UE 115-a may not have established a communication link. For example, upon startup, the UE 115-a may perform a scan to detect resources from the base station 105-a to utilize for subsequent communications. For example, the UE 115-a may perform a scan to detect an SSB associated with a base station beam 205-*a*, a base station beam 205-*b*, and a base station beam 205-*c*. The UE 115-*a* may perform the scan utilizing one or more receive beams, such as a receive beam 210-*a*, a receive beam 210-*b*, and a receive beam 210-*c*.

During the initial acquisition, the UE 115-*a* may scan each base station beam 205 for an SSB, which may indicate resources or associated parameters for the UE 115-*a* to utilize (e.g., via the receive beams 210) for communications operations with the base station 105-*a*. For example, the UE 115-*a* may perform an FFS to search for PSS at frequency corresponding to a GSCN. A GSCN may have a one-to-one correspondence with frequencies including synchronization information. A UE may determine the GSCN parameters as shown in the following table (Table 1):

TABLE 1

| Frequency range | SS Block frequency position $SS_{REF}$ | GSCN | Range of GSCN |
|---|---|---|---|
| 0-3000 MHz | N * 1200 kHz + M * 50 kHz, N = 1:2499, M ∈{1, 3, 5} (Note 1) | 3N + (M − 3)/2 | 2-7498 |
| 3000-24250 MHz | 3000 MHz + N * 1.44 MHz N = 0:14756 The default value for operating bands with which only support SCS spaced channel raster(s) is M = 3. | 7499 + N | 7499-22255 |

As such, the UE 115-*a* may iterate through the base station beams 205 to determine which resources to utilize for communications. In cases where there are many base station beams 205, iterating through available GSCNs may consume non-trivial time and power resources, which may result in adverse effects at the UE 115-*a*. Additionally, one or more GSCNs may not include synchronization information, which may further add to scan times, since some GSCNs may be non-applicable for initial acquisition.

According to one or more aspects depicted in the present disclosure, the UE 115-*a* may utilize a scanning method to quickly reject GSCNs that do not include an SSB. For example, the UE 115-*a* may utilize a coarse binning algorithm (e.g., reduced resolution fast Fourier Transform) and energy patterns associated with GSCNs to quickly determine which GSCNs are associated with SSBs. In some examples, the quick scanning method may detect SSB energy patterns in GSCNs under a variety of loading scenarios (e.g., 10 percent, 50 percent, 75 percent, 100 percent).

In some examples, the UE 115-*a* may receive a downlink signal including an SSB at a frequency corresponding to a GSCN. The SSB may span across a set of symbol periods in a time domain and a set of subcarriers in a frequency domain. The UE 115-*a* may analyze a portion of each symbol period of the set of symbol periods in the time domain across a subset of the set of subcarriers in the frequency domain and may identify an energy pattern corresponding to the SSB. For example, the UE 115-*a* may perform a fast Fourier Transform to obtain a spectrogram associated with one or more GSCNs (e.g., received signals at frequencies corresponding to GSCNs). Additionally, the fast Fourier Transform performed by the UE 115-*a* may correspond to a low-resolution transformation, where data from the received signals corresponding to the one or more GSCNs is down-sampled to reduce computational complexity. For example, the UE 115-*a* may analyze a portion of each received symbol (e.g., an eighth of a symbol) instead of full symbols. Based on the spectrogram, the UE 115-*a* may analyze one or more energy patterns (e.g., through correlation, one or more machine learning algorithms) associated with the received signals to determine which GSCNs, and therefore frequencies, may include an SSB. The UE 115-*a* may then establish a connection with a base station based on the identified energy pattern.

Additionally, although the spectrogram may correspond to a low-resolution representation of the received signals, by leveraging mathematical properties associated with the fast Fourier Transform (e.g., Parseval's Theorem), the UE 115-*a* may determine total energy associated with each GSCN. Determining the total energy associated with each GSCN via a reduced resolution spectrogram may provide for the UE 115-*a* to quickly determine valid GSCNs (e.g., including SSBs) while reducing a search space associated with initial acquisition. Based on the determination of valid GSCNs, the UE 115-*a* may establish one or more communication links with the base station 105-*a*.

Figure 3:
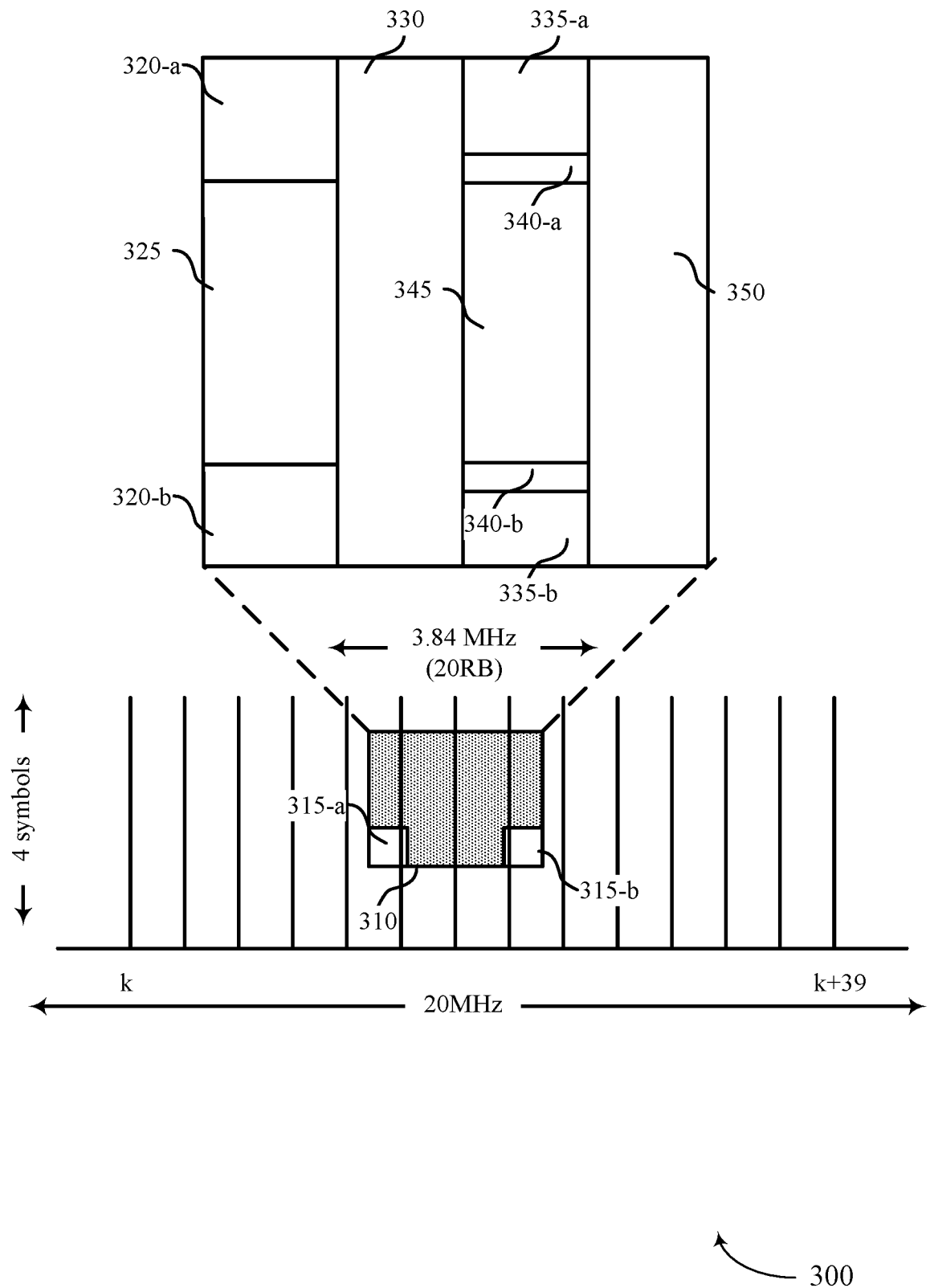
FIG. 3 illustrates an example of a global synchronization channel number (GSCN) pattern that supports techniques to perform energy scans in NR in accordance with aspects of the present disclosure.

FIG. 3 illustrates an example of a GSCN pattern 300 that supports techniques to perform energy scans in NR in accordance with aspects of the present disclosure. The GSCN pattern 300 may be implemented by one or more aspects of the wireless communications system 100 and the wireless communications system 200. For example, the GSCN pattern 300 may correspond to communications associated with a UE and a base station, which may be an example of the UE 115 and the base station 105 as described with reference to FIG. 1. It should be noted that, while examples are discussed below, any number of devices and device types may be used to accomplish implementations described in the present disclosure.

To perform efficient energy scans to determine what resources to utilize, the UE may locate a given GSCN and perform one or more analyses on energy patterns associated with a given GSCN. To locate a given GSCN, in some examples, the UE may utilize spacings associated with GSCNs as well as associated subcarrier spacings (SCS). As depicted in the example of FIG. 3, the UE may examine subcarriers k through k+39. GSCNs may be spaced at most 1.2 MHz in sub 3 GHz bands and 1.44 MHz in sub 6 GHz bands. In some cases, sub 3 GHz bands may include up to 3 GSCNs spaced at 100 KHz (e.g., represented by M={1, 3, 5}), where the UE may utilize a given SCS to locate and analyze the GSCNs. In some examples, however, such as frequencies above 3 GHz, a given SCS (e.g., SCS15 KHz) may not be defined.

In other examples, however, the UE may utilize patterns associated with GSCNs to determine the presence of SSBs. Notably, the UE may utilize the presence of multiple GSCNs to test multiple GSCNs when performing an SSB power computation. For example, a number of GSCNs captured in 20 MHz with a SCS of 15 KHz may correspond to 39 in sub 3 GHz bands (e.g., if M={1, 3, 5}). In other examples, the number of GSCNs captured in 20 MHz with an SCS of 30

KHz may correspond to 24 (e.g., if M={1, 3, 5}). In some examples, such as when M=3, the number of GSCNs may correspond to 13 in SCS 15 KHz and 8 in SCS 30 KHz. Lastly, in sub 6 GHz, the number of GSCNs may correspond to 8 in SCS 30 KHz. It should be noted that, while specific examples of bandwidths, sample sizes, and SCSs are used to further elucidate aspects of the present disclosure, the techniques and methods described herein may be applied with any bandwidth, sample size, and SCSs. Additionally, techniques and methods described in the present disclosure are scalable with NR numerologies (e.g., as SSBs scale). In some cases, implementations of the present disclosure may be governed by a front-end bandwidth associated with a receiver. In other cases, FFT sizes may depend on SCS as well as the front-end bandwidth.

The UE may examine one or more symbols (e.g., 4 symbols, as illustrated in FIG. 3), along with an associated frequency band and an SCS (e.g., SCS15 KHz, SCS30 KHz), to determine if an energy pattern associated with the multiple GSCNs includes an SSB. For example, the UE may utilize 4 symbols over a 20 MHz band to examine a GSCN pattern 310. In some cases, the UE may determine a pattern associated with the GSCNs corresponds to 20 resource blocks (RBs) over 3.84 MHz. In some examples, the pattern may be adjacent to empty symbols 315-a and 315-b.

Based on detecting the GSCN pattern 310, the UE may determine further contents of the frequency band associated with the GSCN pattern 310. For example, using the GSCN pattern, the UE may determine a PSS 325 (spanning 127 subcarriers) associated with the GSCN pattern 310, where the PSS 325 may be between two no transmission symbols 320-a (spanning 57 subcarriers) and 320-b (spanning 56 subcarriers). The no transmission symbols 320-a and 320-b may be comparable in bandwidth to the PSS 325. Additionally, the UE may determine a PBCH and DMRS symbol 330 (spanning 240 subcarriers) associated with the GSCN pattern 310. Further, the UE may obtain additional PBCH and DMRS information from PBCH and DMRS symbols 335-a (spanning 48 subcarriers) and 335-b (spanning 48 subcarriers). In some examples, the UE may also determine an SSS symbol 345 (spanning 127 subcarriers), where the SSS symbol 345 may be adjacent to two no transmission symbols 340-a (spanning 9 subcarriers) and 340-b (spanning 8 subcarriers). Lastly, the UE may obtain a PBCH and DMRS symbol 350 (spanning 240 subcarriers) utilizing the GSCN pattern 310. By utilizing the GSCN pattern 310, the UE may quickly determine contents of an associated SSB.

Figure 4:
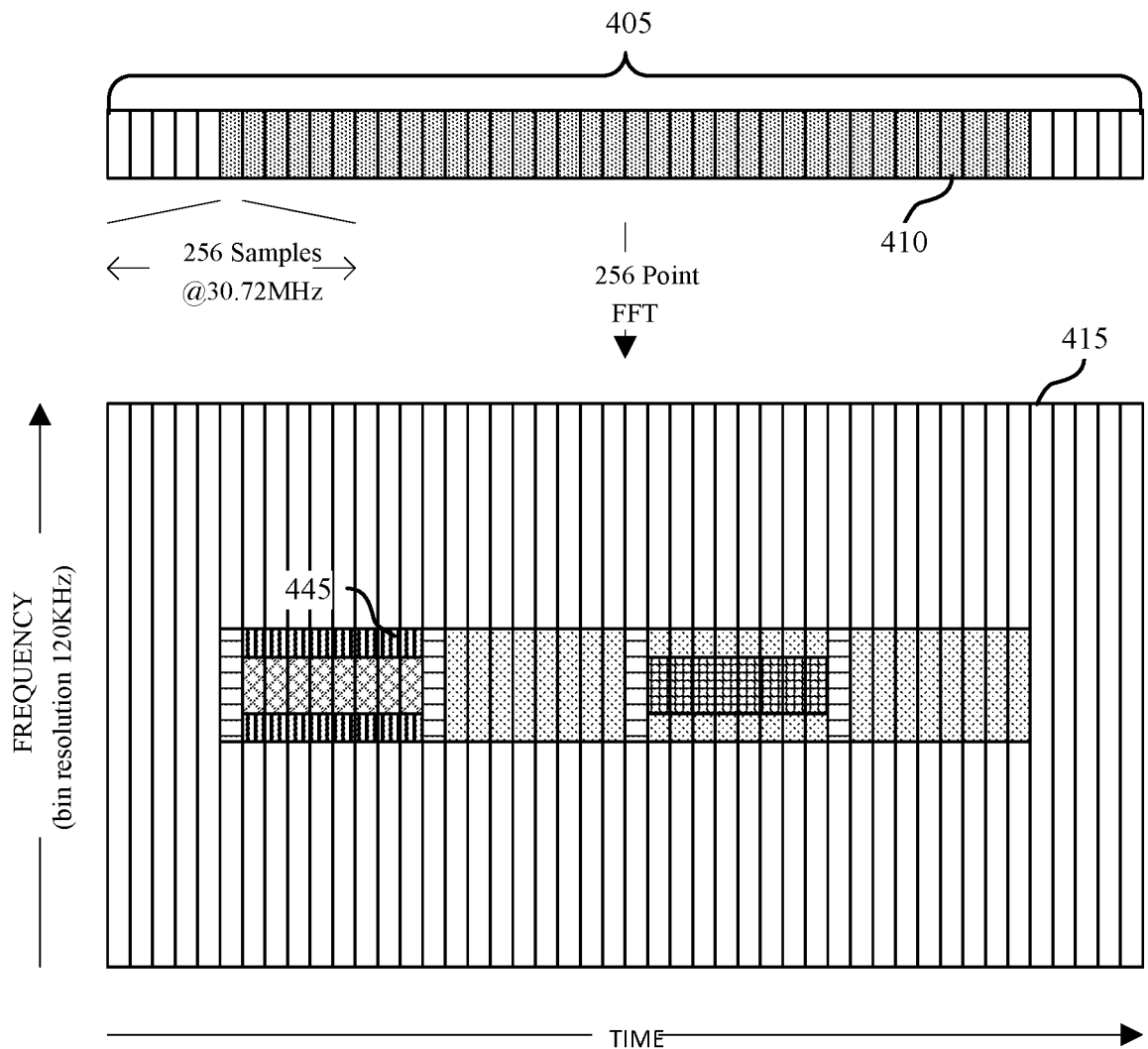
FIG. 4 illustrates an example of an energy pattern that supports techniques to perform energy scans in NR in accordance with aspects of the present disclosure.

FIG. 4 illustrates an example of an energy pattern 400 that supports techniques to perform energy scans in NR in accordance with aspects of the present disclosure. The energy pattern 400 may be utilized by one or more aspects of the wireless communications system 100 and the wireless communications system 200. For example, the energy pattern 400 may be utilized by a UE, which may be an example of the UE 115 as described with reference to FIG. 1. It should be noted that, while examples are discussed below, any number of devices and device types may be used to accomplish implementations described in the present disclosure.

In some examples, the UE may receive a signal 405 in the time domain. The signal 405 may include many samples characterizing the signal. For example, a signal block 410 may correspond to 256 samples at 30.72 MHz. In some cases, such as when the UE performs a transformation on the time domain signal 405 to begin searching for GSCNs with SSBs, the number of samples may impact the efficiency with which the UE performs the transformation. Additionally, the number of samples after the transformation may pose a non-trivial amount of information to the UE for analysis to determine which GSCNs may include SSBs. For example, the transformation may include thousands of samples, where the UE may attempt pattern matching by iterating through the samples, which may increase latency at the UE.

In some examples, however, to reduce complexity in determining a GSCN pattern, an SSB pattern, or both, the UE may utilize a coarse binning transformation to reduce the resolution of a received signal, thereby reducing a complexity associated with subsequent mathematical operations on the reduced resolution signal. For example, the UE may perform a 256 point fast Fourier Transform on the time domain signal 405. In some examples, the coarse binning performed by the UE may correspond to a short time burst (e.g., an eighth of an OFDM symbol), where the short time bursts are analyzed in frequency with coarse bins (e.g., bin width is equal to eight subcarriers).

Based on the fast Fourier Transform, in some examples, the UE may obtain a spectrogram 415 representing a down-sampled version of the time domain signal 405. The spectrogram 415 may be assembled based on one or more filtering techniques, concatenation techniques, or both. For example, the UE may utilize time domain filtering of the frequency bins to combine the bins to correspond to one OFDM symbol length. Additionally, four such consecutive symbol energies may be tested for a pattern associated with SSBs.

For example, the UE may perform pattern matching on the spectrogram 415 (e.g., using general pattern matching techniques, which may correspond to correlation techniques, machine learning techniques such as convolutional neural networks, among other techniques) to detect a pattern 445. The pattern 445 may correspond to one or more GSCNs with associated symbols, which may include an SSB. For example, the UE may determine that the pattern 445 is present within the spectrogram 415 and examine energies related to the pattern 445, to portions of the pattern 445, or both. In some cases, the UE may measure an energy associated with a PSS 430 within the pattern 445. In such cases, the UE may determine that the PSS 430 may be surrounded by gap symbols 425, no transmission symbols 420, or both. Additionally, the UE may determine a PBCH and DMRS 435 and associated energies from the pattern 445. Additionally, the UE may determine an energy associated with an SSS 440.

Based on the measured energies, the UE may determine if a GSCN includes an SSB. For example, the UE may compare the measured energies to an off energy associated with a GSCN with no SSB, and an on energy associated with a GSCN with an SSB. Based on the comparison, the UE may determine the frequency resources associated with a given GSCN includes an SSB. Additionally, since the measuring of energies is performed on a reduced resolution representation of the time domain signal 405, the UE may determine if energy levels are below levels expected from a GSCN carrying an SSB, allowing the UE to quickly reject GSCNs that do not include an SSB.

Figure 5:
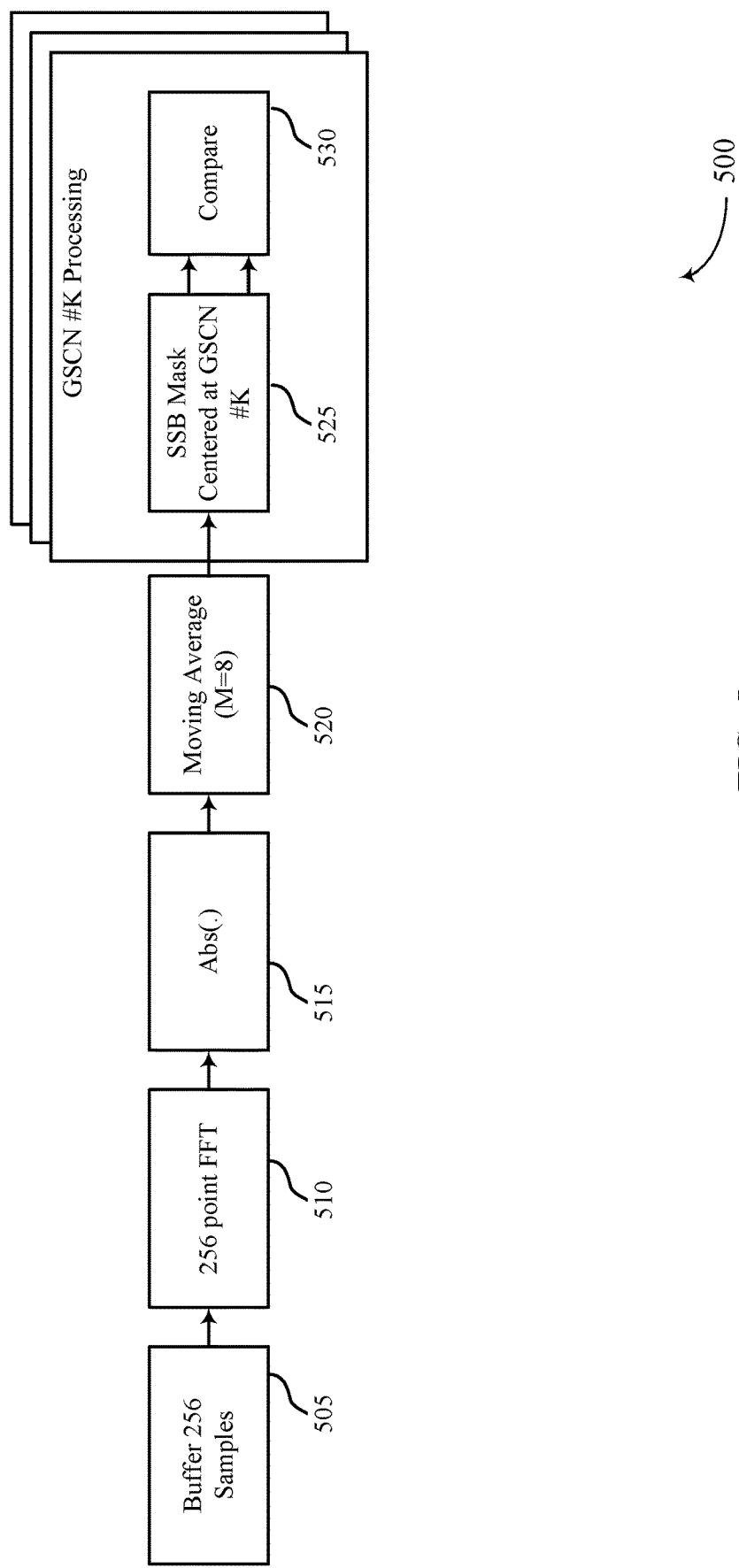
FIG. 5 illustrates an example of a process flow that supports techniques to perform energy scans in NR in accordance with aspects of the present disclosure.

FIG. 5 illustrates an example of a process flow 500 that supports techniques to perform energy scans in NR in accordance with aspects of the present disclosure. The process flow 500 may be implemented by one or more wireless devices, such as a UE, which may be an example of a UE 115 as described with reference to FIG. 1. In some examples, the process flow 500 may include one or more operations and procedures associated with the base station 105 and UEs 115, which may be examples of those discussed with reference to FIGS. 2-4. While specific operations may be discussed below, the operations may be performed in a different order than the example order shown, or the operations performed by the devices may be performed by different devices or at different times.

The UE may receive a time domain signal during initial acquisition procedures, where the UE may examine a number of GSCNs associated with the time domain signal to determine a set of resources to utilize for subsequent communications. At 505, the UE may buffer 256 samples from the time domain signal (e.g., or any other buffer sample size) to utilize in a down-sampling transformation, where the samples may correspond to a portion of an OFDM symbol (e.g., an eighth of a symbol). For example, symbol energy may be binned per 120 KHz at an offset of an eighth of a symbol in time.

For example, at 510, the UE may utilize the buffered 256 samples from the time domain signal to perform a fast Fourier Transform. Energy computations within frequency bins obtained from the fast Fourier Transform at 510. Additionally or alternatively, the frequency bins may be disjoint in time. At 515, the UE may perform one or more mathematical operations (e.g., absolute value) on the 256 point fast Fourier Transform. At 520, the UE may perform a moving average (e.g., M=8) on the 256 point fast Fourier Transform, where the moving average (e.g., across time) may produce full symbols from the portions of OFDM symbols obtained during the buffering at 505.

Based on the moving average performed at 520, the UE may perform processing to determine if a given GSCN includes SSB information. For example, at 525, the UE may implement an SSB mask centered at a GSCN frequency at a given subcarrier K. For example, bins corresponding to GSCN center frequencies and bandwidth may be obtained from the SSB mask. As discussed with reference to FIG. 4, the UE may determine energies associated with the GSCN frequency obtained from the SSB mask and compare the energies to one or more metrics. For example, the UE may compare the determined energies to an on-energy amount at 530. If the determined energies are above the on-energy amount, the UE may determine that the given GSCN includes an SSB. Additionally or alternatively, the UE may compare the determined energies to an off-energy amount at 530. If the determined energies are below an off-energy amount (e.g., or comparable), the UE may determine the given GSCN does not include an SSB, allowing the UE to quickly reject GSCNs with no accompanying SSB.

In some examples, the UE may perform searches over 20 ms (e.g., or other periodicities), which may provide at least one SSB processed on GSCN. The UE may utilize one or more techniques to determine if a pattern of energy associated with a GSCN correspond to an SSB using pattern matching techniques. For example, the UE may utilize machine learning techniques, such as a convolutional neural network, to perform pattern matching. Additionally or alternatively, the UE may utilize correlation techniques, such as a correlation detector, to determine if a pattern corresponding to an SSB is present in the energies. For example, the UE may utilize received power in a 2-dimensional grid (e.g., x(n), where n=0, 1, . . . N−1), a reference pattern, and one or more mathematical techniques to correlate received signals to one or more patterns. The UE may utilize a reference pattern as depicted by Equation 1:

$$r(n) = \begin{cases} -w0, & \text{if } n \in \text{OFF} \\ w1, & \text{if } n \in \text{ON} \end{cases} \quad (1)$$

The UE may determine one or more metrics to utilize along with the reference patterns to enable the correlation detector to match one or more received signals. For example, the UE may obtain a first metric $$y(n) = x(n) - \sum_n \frac{x(n)}{N},$$

along with a second metric $$z(n) = \frac{y(n)}{\sqrt{\sum_n y(n)^2}}$$

to perform pattern matching. In some examples, the UE may utilize the second metric and the reference pattern to obtain a correlation statistic. For example, the UE may utilize Equation 2 to obtain the correlation statistic:

$$s(n) = \sum_n r(n)z(n) \quad (2)$$

which may be alternatively represented as $s(n)=w1\Sigma_{ON}z(n)-w0\Sigma_{OFF}z(n)$.

Based on the correlation detector and the pattern matching, the UE may utilize results from the pattern to augment conventional PSS detection (e.g., FFS) to confirm a presence of SSB.

Figure 6:
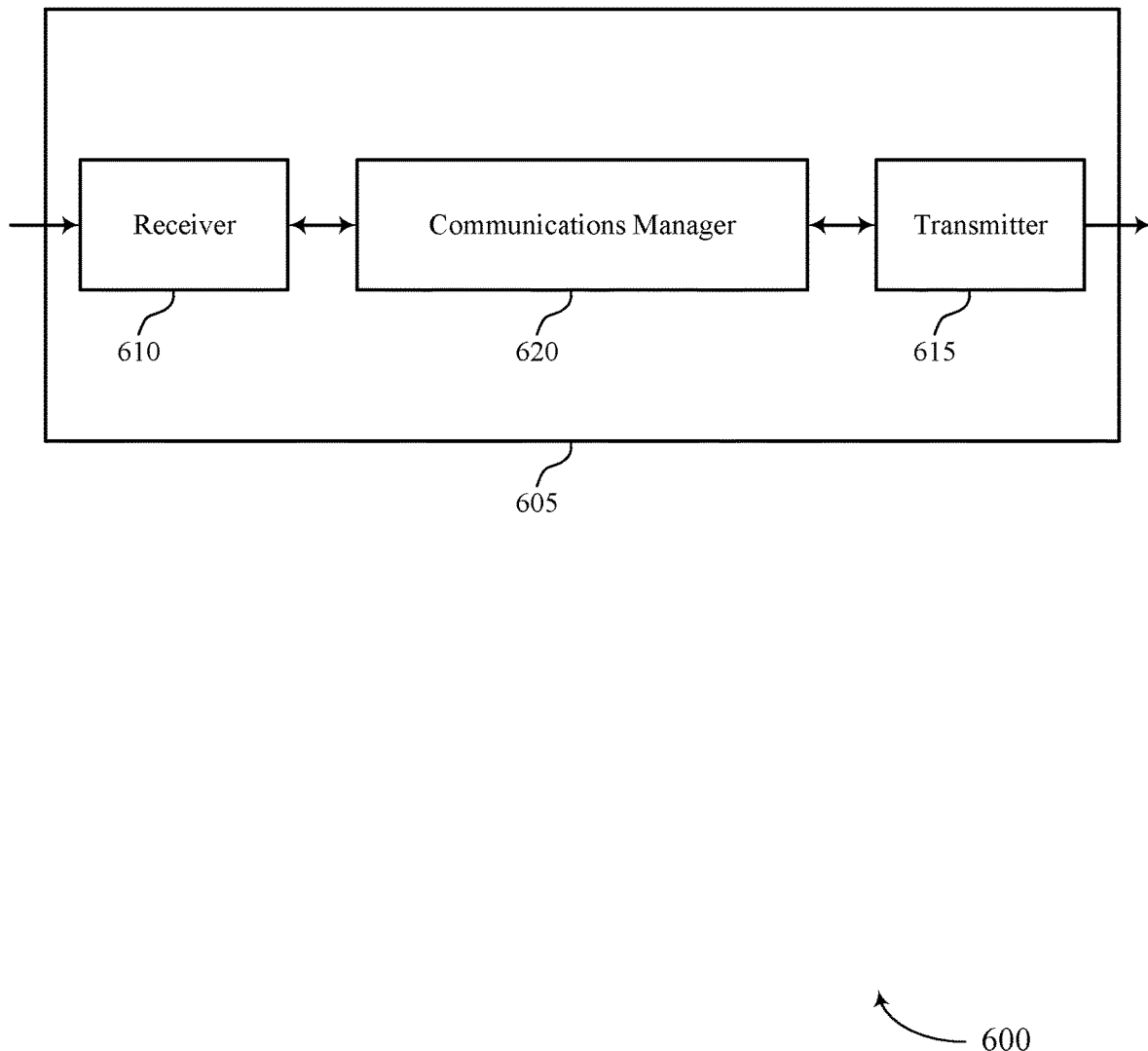
FIGS. 6 and 7 show block diagrams of devices that support techniques to perform energy scans in NR in accordance with aspects of the present disclosure.

FIG. 6 shows a block diagram 600 of a device 605 that supports techniques to perform energy scans in NR in accordance with aspects of the present disclosure. The device 605 may be an example of aspects of a UE 115 as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques to perform energy scans in NR). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques to perform energy scans in NR). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques to perform energy scans in NR as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled to the at least one processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by at least one processor. If implemented in code executed by at least one processor, the functions of the communications manager 620, the receiver 610, the transmitter 615, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving a downlink signal including an SSB at a frequency corresponding to a global synchronization channel number, the SSB spanning across a set of symbol periods in time domain and a set of subcarriers in frequency domain. The communications manager 620 may be configured as or otherwise support a means for analyzing a portion of each symbol period of the set of symbol periods in the time domain across a subset of the set of subcarriers in the frequency domain. The communications manager 620 may be configured as or otherwise support a means for identifying an energy pattern corresponding to the SSB based on the analyzing. The communications manager 620 may be configured as or otherwise support a means for establishing a connection with a base station based on the identified energy pattern.

By including or configuring the communications manager 620 in accordance with examples as described herein, the device 605 (e.g., at least one processor controlling or otherwise coupled to the receiver 610, the transmitter 615, the communications manager 620, or a combination thereof) may support techniques for reduced processing, reduced power consumption, more efficient utilization of communication resources by performing down-sampling techniques to determine if a given GSCN includes an SSB.

Figure 7:
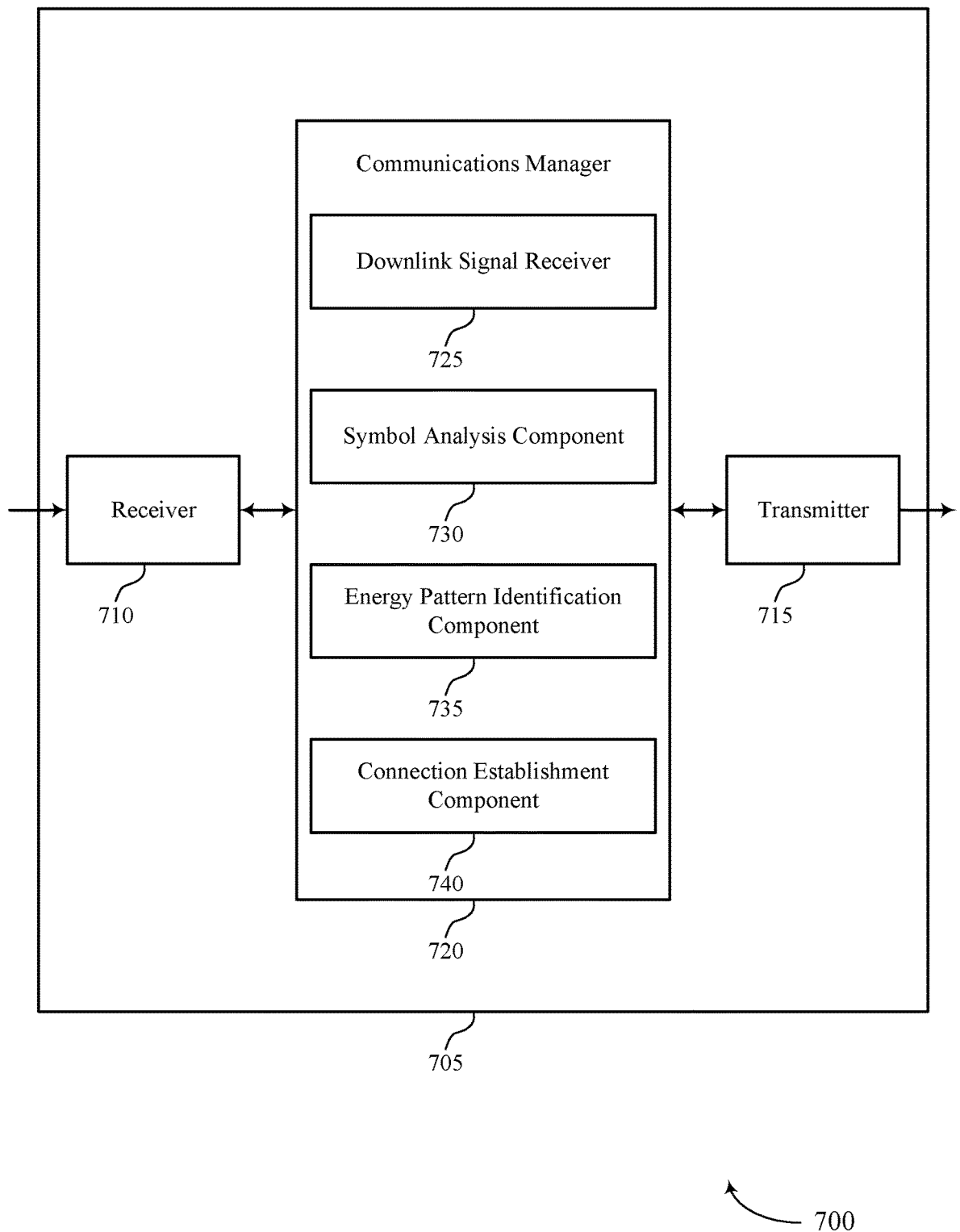

FIG. 7 shows a block diagram 700 of a device 705 that supports techniques to perform energy scans in NR in accordance with aspects of the present disclosure. The device 705 may be an example of aspects of a device 605 or a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques to perform energy scans in NR). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques to perform energy scans in NR). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques to perform energy scans in NR as described herein. For example, the communications manager 720 may include a downlink signal receiver 725, a symbol analysis component 730, an energy pattern identification component 735, a connection establishment component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The downlink signal receiver 725 may be configured as or otherwise support a means for receiving a downlink signal including an SSB at a frequency corresponding to a global synchronization channel number, the SSB spanning across a set of symbol periods in time domain and a set of subcarriers in frequency domain. The symbol analysis component 730 may be configured as or otherwise support a means for analyzing a portion of each symbol period of the set of symbol periods in the time domain across a subset of the set of subcarriers in the frequency domain. The energy pattern identification component 735 may be configured as or otherwise support a means for identifying an energy pattern corresponding to the SSB based on the analyzing. The connection establishment component 740 may be configured as or otherwise support a means for establishing a connection with a base station based on the identified energy pattern.

Figure 8:
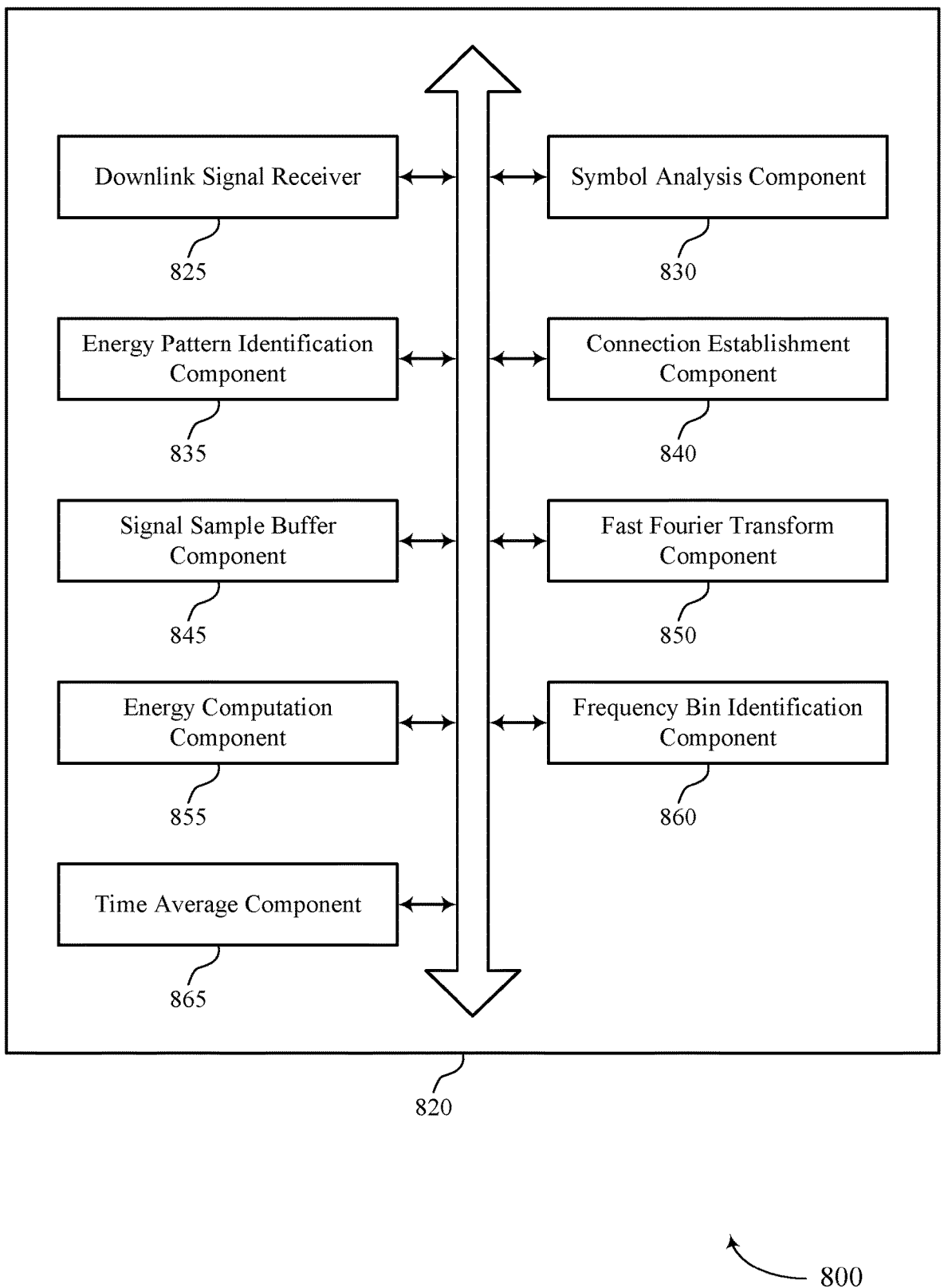
FIG. 8 shows a block diagram of a communications manager that supports techniques to perform energy scans in NR in accordance with aspects of the present disclosure.

FIG. 8 shows a block diagram 800 of a communications manager 820 that supports techniques to perform energy scans in NR in accordance with aspects of the present disclosure. The communications manager 820 may be an example of aspects of a communications manager 620, a communications manager 720, or both, as described herein. The communications manager 820, or various components thereof, may be an example of means for performing various aspects of techniques to perform energy scans in NR as described herein. For example, the communications manager 820 may include a downlink signal receiver 825, a symbol analysis component 830, an energy pattern identification component 835, a connection establishment component 840, a signal sample buffer component 845, a fast Fourier transform component 850, an energy computation component 855, a frequency bin identification component 860, a time average component 865, or any combination thereof. Each of these components may communicate, directly or indirectly, with one another (e.g., via one or more buses).

The communications manager 820 may support wireless communication at a UE in accordance with examples as disclosed herein. The downlink signal receiver 825 may be configured as or otherwise support a means for receiving a downlink signal including an SSB at a frequency corresponding to a global synchronization channel number, the SSB spanning across a set of symbol periods in time domain and a set of subcarriers in frequency domain.

The symbol analysis component 830 may be configured as or otherwise support a means for analyzing a portion of each symbol period of the set of symbol periods in the time domain across a subset of the set of subcarriers in the frequency domain. The energy pattern identification component 835 may be configured as or otherwise support a means for identifying an energy pattern corresponding to the SSB based on the analyzing. The connection establishment component 840 may be configured as or otherwise support a means for establishing a connection with a base station based on the identified energy pattern.

In some examples, the downlink signal receiver 825 may be configured as or otherwise support a means for receiving the downlink signal including a first set of multiple signal samples at a first frequency. In some examples, the signal sample buffer component 845 may be configured as or otherwise support a means for buffering a second set of multiple signal samples, where the first set of multiple signal samples is greater than the second set of multiple signal samples.

In some examples, the fast Fourier transform component 850 may be configured as or otherwise support a means for performing a fast Fourier transform of the second set of multiple signal samples to identify a set of frequency bins. In some examples, the energy computation component 855 may be configured as or otherwise support a means for computing an energy for each frequency bin of the set of frequency bins, where identifying the energy pattern corresponding to the SSB is based on computing the energy for each frequency bin.

In some examples, the time average component 865 may be configured as or otherwise support a means for performing an average across the time domain to compute the energy in each frequency bin of the set of frequency bins over a symbol period of the set of symbol periods. In some examples, each frequency bin of the set of frequency bins include the subset of the set of subcarriers. In some examples, each frequency bin of the set of frequency bins are disjoint in time.

In some examples, the fast Fourier transform component 850 may be configured as or otherwise support a means for performing a fast Fourier transform of the second set of multiple signal samples to identify a set of frequency bins. In some examples, the frequency bin identification component 860 may be configured as or otherwise support a means for identifying one or more frequency bins corresponding to a center frequency and bandwidth for the global synchronization channel number.

In some examples, the energy pattern identification component 835 may be configured as or otherwise support a means for determining that an energy for a first frequency bin is less that an energy for a second frequency bin, where identifying the energy pattern corresponding to the SSB is based on determining the energy for the first frequency bin and an energy for the second frequency bin. In some examples, the second frequency bin corresponds to a symbol period of the set of symbol periods.

In some examples, the energy pattern corresponding to the SSB spans across for consecutive symbol periods. In some examples, the symbol period includes an orthogonal frequency-division multiplexing symbol and the portion of each symbol period includes an eighth of the orthogonal frequency-division multiplexing symbol.

Figure 9:
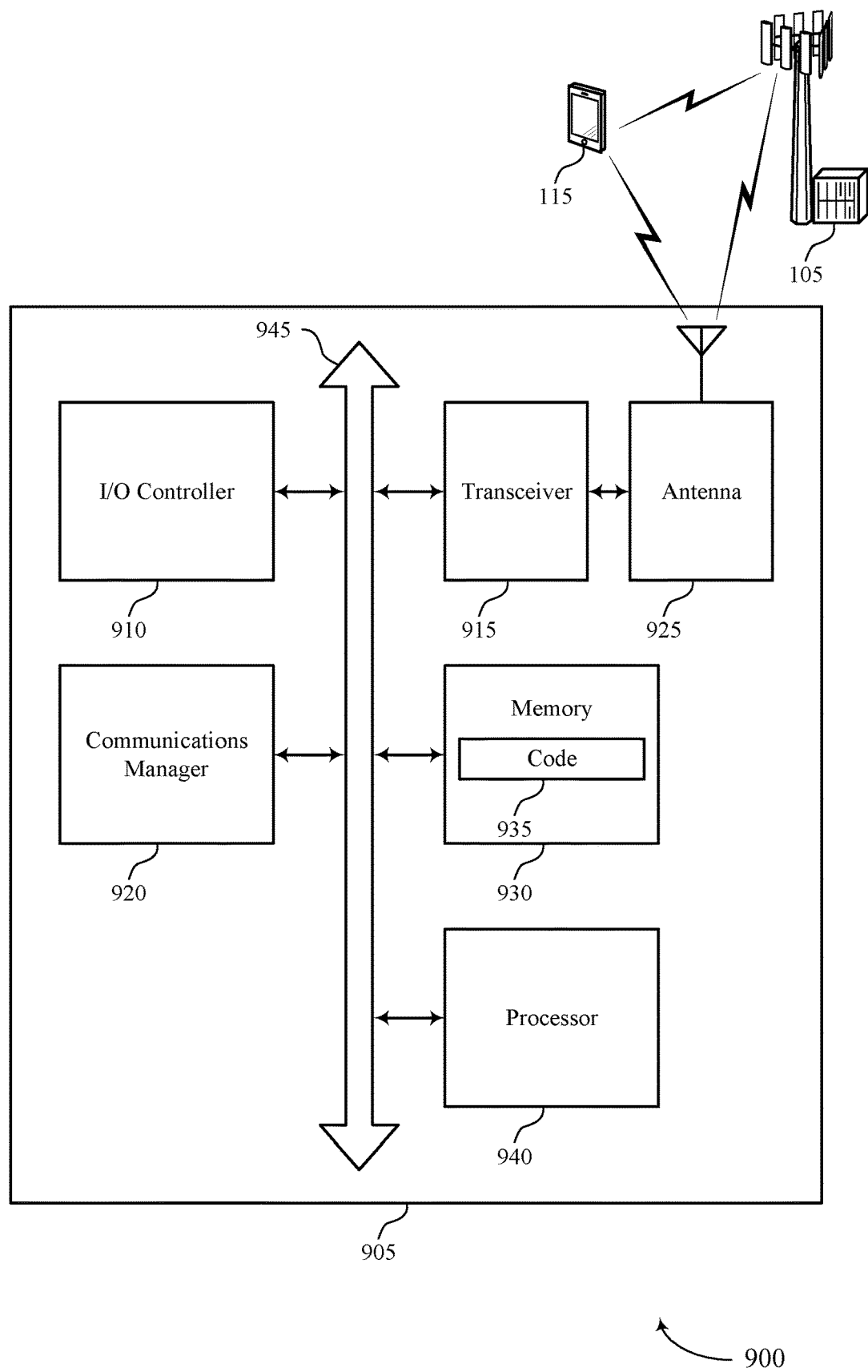
FIG. 9 shows a diagram of a system including a device that supports techniques to perform energy scans in NR in accordance with aspects of the present disclosure.

FIG. 9 shows a diagram of a system 900 including a device 905 that supports techniques to perform energy scans in NR in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of at least one processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques to perform energy scans in NR). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a downlink signal including an SSB at a frequency corresponding to a global synchronization channel number, the SSB spanning across a set of symbol periods in time domain and a set of subcarriers in frequency domain. The communications manager 920 may be configured as or otherwise support a means for analyzing a portion of each symbol period of the set of symbol periods in the time domain across a subset of the set of subcarriers in the frequency domain. The communications manager 920 may be configured as or otherwise support a means for identifying an energy pattern corresponding to the SSB based on the analyzing. The communications manager 920 may be configured as or otherwise support a means for establishing a connection with a base station based on the identified energy pattern.

By including or configuring the communications manager 920 in accordance with examples as described herein, the device 905 may support techniques for improved communication reliability, reduced latency, improved user experience related to reduced processing, reduced power consumption, and more efficient utilization of communication resources by performing down-sampling techniques to determine if a given GSCN includes an SSB.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques to perform energy scans in NR as described herein, or the processor 940 and the memory 930 may be otherwise configured to perform or support such operations.

Figure 10:
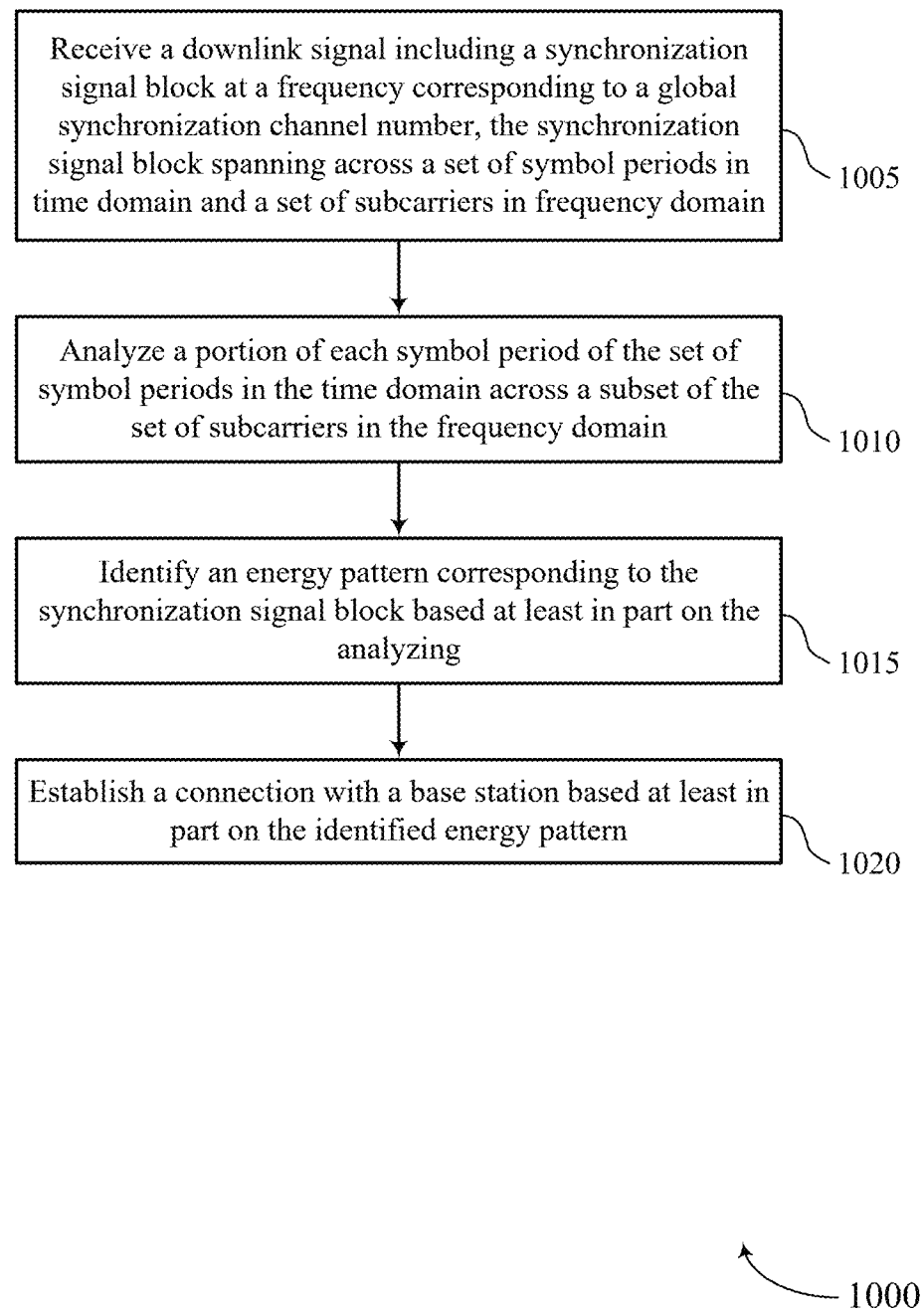
FIGS. 10 and 11 show flowcharts illustrating methods that support techniques to perform energy scans in NR in accordance with aspects of the present disclosure.

FIG. 10 shows a flowchart illustrating a method 1000 that supports techniques to perform energy scans in NR in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving a downlink signal including an SSB at a frequency corresponding to a global synchronization channel number, the SSB spanning across a set of symbol periods in time domain and a set of subcarriers in frequency domain. The operations of 1005 may be performed in accordance with examples as disclosed herein. In some examples, aspects of the operations of 1005 may be performed by a downlink signal receiver 825 as described with reference to FIG. 8.

At 1010, the method may include analyzing a portion of each symbol period of the set of symbol periods in the time domain across a subset of the set of subcarriers in the frequency domain. The operations of 1010 may be performed in accordance with examples as disclosed herein. In some examples, aspects of the operations of 1010 may be performed by a symbol analysis component 830 as described with reference to FIG. 8.

At 1015, the method may include identifying an energy pattern corresponding to the SSB based at least in part on the analyzing. The operations of 1015 may be performed in accordance with examples as disclosed herein. In some examples, aspects of the operations of 1015 may be performed by an energy pattern identification component 835 as described with reference to FIG. 8.

At 1020, the method may include establishing a connection with a base station based at least in part on the identified energy pattern. The operations of 1020 may be performed in accordance with examples as disclosed herein. In some examples, aspects of the operations of 1020 may be performed by a connection establishment component 840 as described with reference to FIG. 8.

Figure 11:
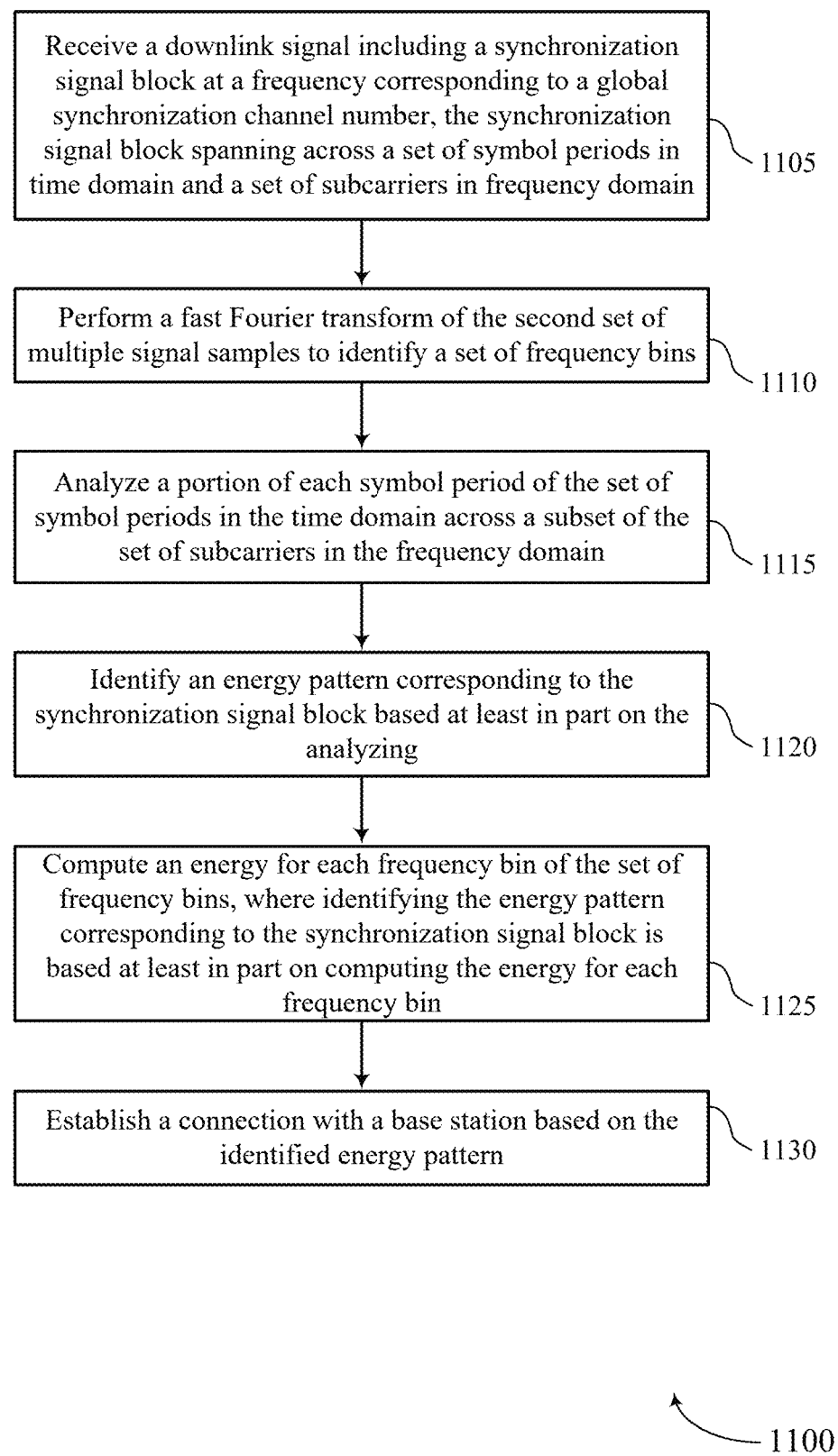

FIG. 11 shows a flowchart illustrating a method 1100 that supports techniques to perform energy scans in NR in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving a downlink signal including an SSB at a frequency corresponding to a global synchronization channel number, the SSB spanning across a set of symbol periods in time domain and a set of subcarriers in frequency domain. The operations of 1105 may be performed in accordance with examples as disclosed herein. In some examples, aspects of the operations of 1105 may be performed by a downlink signal receiver 825 as described with reference to FIG. 8.

At 1110, the method may include performing a fast Fourier transform of the second set of multiple signal samples to identify a set of frequency bins. The operations of 1110 may be performed in accordance with examples as disclosed herein. In some examples, aspects of the operations of 1110 may be performed by a fast Fourier transform component 850 as described with reference to FIG. 8.

At 1115, the method may include analyzing a portion of each symbol period of the set of symbol periods in the time domain across a subset of the set of subcarriers in the frequency domain. The operations of 1115 may be performed in accordance with examples as disclosed herein. In some examples, aspects of the operations of 1115 may be performed by a symbol analysis component 830 as described with reference to FIG. 8.

At 1120, the method may include identifying an energy pattern corresponding to the SSB based at least in part on the analyzing. The operations of 1120 may be performed in accordance with examples as disclosed herein. In some examples, aspects of the operations of 1120 may be performed by an energy pattern identification component 835 as described with reference to FIG. 8.

At 1125, the method may include computing an energy for each frequency bin of the set of frequency bins, where identifying the energy pattern corresponding to the SSB is based at least in part on computing the energy for each frequency bin. The operations of 1125 may be performed in accordance with examples as disclosed herein. In some examples, aspects of the operations of 1125 may be performed by an energy computation component 855 as described with reference to FIG. 8.

At 1130, the method may include establishing a connection with a base station based on the identified energy pattern. The operations of 1130 may be performed in accordance with examples as disclosed herein. In some examples, aspects of the operations of 1130 may be performed by a connection establishment component 840 as described with reference to FIG. 8.

The following provides an overview of aspects of the present disclosure:

Aspect 1: A method for wireless communication at a UE, comprising: receiving a downlink signal comprising an SSB at a frequency corresponding to a global synchronization channel number, the SSB spanning across a set of symbol periods in time domain and a set of subcarriers in frequency domain; analyzing a portion of each symbol period of the set of symbol periods in the time domain across a subset of the set of subcarriers in the frequency domain; identifying an energy pattern corresponding to the SSB based at least in part on the analyzing; and establishing a connection with a base station based at least in part on the identified energy pattern.

Aspect 2: The method of aspect 1, further comprising: receiving the downlink signal comprising a first plurality of signal samples at a first frequency; and buffering a second plurality of signal samples, wherein the first plurality of signal samples is greater than the second plurality of signal samples.

Aspect 3: The method of aspect 2, further comprising: performing a fast Fourier transform of the second plurality of signal samples to identify a set of frequency bins; and computing an energy for each frequency bin of the set of frequency bins, wherein identifying the energy pattern corresponding to the SSB is based at least in part on computing the energy for each frequency bin.

Aspect 4: The method of aspect 3, further comprising: performing an average across the time domain to compute the energy in each frequency bin of the set of frequency bins over a symbol period of the set of symbol periods.

Aspect 5: The method of any of aspects 3 through 4, wherein each frequency bin of the set of frequency bins comprises the subset of the set of subcarriers.

Aspect 6: The method of any of aspects 3 through 5, wherein each frequency bin of the set of frequency bins are disjoint in time.

Aspect 7: The method of any of aspects 2 through 6, further comprising: performing a fast Fourier transform of the second plurality of signal samples to identify a set of frequency bins; identifying one or more frequency bins corresponding to a center frequency and bandwidth for the global synchronization channel number; and determining that an energy for a first frequency bin is less that an energy for a second frequency bin, wherein identifying the energy pattern corresponding to the SSB is based at least in part on determining the energy for the first frequency bin and an energy for the second frequency bin.

Aspect 8: The method of aspect 7, wherein the second frequency bin corresponds to a symbol period of the set of symbol periods.

Aspect 9: The method of any of aspects 1 through 8, wherein the energy pattern corresponding to the SSB spans across for consecutive symbol periods.

Aspect 10: The method of any of aspects 1 through 9, wherein the symbol period comprises an orthogonal frequency-division multiplexing symbol and the portion of each symbol period comprises an eighth of the orthogonal frequency-division multiplexing symbol.

Aspect 11: An apparatus for wireless communication at a UE, comprising at least one processor; memory coupled to the at least one processor, the memory storing instructions executable by the at least one processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by at least one processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a downlink signal comprising a synchronization signal block at a frequency corresponding to a global synchronization channel number, the synchronization signal block spanning across a set of symbol periods in time domain and a set of subcarriers in frequency domain;
   analyzing a portion of each symbol period of the set of symbol periods in the time domain across a subset of the set of subcarriers in the frequency domain, wherein analyzing the portion of each symbol period comprises obtaining one or more energy measurements during the portion of each symbol period;
   identifying an energy pattern corresponding to the synchronization signal block based at least in part on a comparison of the one or more energy measurements obtained from the analyzing; and
   establishing a connection with a network entity based at least in part on the identified energy pattern.

2. The method of claim 1, further comprising:
   receiving the downlink signal comprising a first plurality of signal samples at a first frequency; and
   buffering a second plurality of signal samples, wherein the first plurality of signal samples is greater than the second plurality of signal samples.

3. The method of claim 2, further comprising:
   performing a fast Fourier transform of the second plurality of signal samples to identify a set of frequency bins; and
   computing an energy for each frequency bin of the set of frequency bins, wherein identifying the energy pattern corresponding to the synchronization signal block is based at least in part on computing the energy for each frequency bin, and wherein the one or more energy measurements obtained include the energy computed for each frequency bin of the set of frequency bins.

4. The method of claim 3, further comprising:
   performing an average across the time domain to compute the energy in each frequency bin of the set of frequency bins over a symbol period of the set of symbol periods.

5. The method of claim 3, wherein each frequency bin of the set of frequency bins comprises the subset of the set of subcarriers.

6. The method of claim 3, wherein each frequency bin of the set of frequency bins are disjoint in time.

7. The method of claim 2, further comprising:
   performing a fast Fourier transform of the second plurality of signal samples to identify a set of frequency bins;
   identifying one or more frequency bins corresponding to a center frequency and bandwidth for the global synchronization channel number; and
   determining that an energy of a first frequency bin is less that an energy of a second frequency bin, wherein identifying the energy pattern corresponding to the synchronization signal block and the comparison of the one or more energy measurements is based at least in part on determining the energy of the first frequency bin and the energy of the second frequency bin, the one or more energy measurements comprising the energy of the first frequency bin and the energy of the second frequency bin.

8. The method of claim 7, wherein the second frequency bin corresponds to a symbol period of the set of symbol periods.

9. The method of claim 1, wherein the energy pattern corresponding to the synchronization signal block spans across for consecutive symbol periods.

10. The method of claim 1, wherein the set of symbol periods comprises an orthogonal frequency-division multiplexing symbol and the portion of each symbol period of the set of symbol periods comprises an eighth of the orthogonal frequency-division multiplexing symbol.

11. An apparatus for wireless communication at a user equipment (UE), comprising:
    at least one processor; and
    memory coupled to the at least one processor, the memory storing instructions executable by the at least one processor to cause the UE to:
    receive a downlink signal comprising a synchronization signal block at a frequency corresponding to a global synchronization channel number, the synchronization signal block spanning across a set of symbol periods in time domain and a set of subcarriers in frequency domain;
    analyze a portion of each symbol period of the set of symbol periods in the time domain across a subset of the set of subcarriers in the frequency domain, wherein analyzing the portion of each symbol period comprises obtaining one or more energy measurements during the portion of each symbol period;
    identify an energy pattern corresponding to the synchronization signal block based at least in part on a comparison of the one or more energy measurements obtained from the analyzing; and
    establish a connection with a network entity based at least in part on the identified energy pattern.

12. The apparatus of claim 11, wherein the instructions are further executable by the processor to cause the UE to:
    receive the downlink signal comprising a first plurality of signal samples at a first frequency; and
    buffer a second plurality of signal samples, wherein the first plurality of signal samples is greater than the second plurality of signal samples.

13. The apparatus of claim 12, wherein the instructions are further executable by the processor to cause the UE to:
    perform a fast Fourier transform of the second plurality of signal samples to identify a set of frequency bins; and
    compute an energy for each frequency bin of the set of frequency bins, wherein identifying the energy pattern corresponding to the synchronization signal block is based at least in part on computing the energy for each frequency bin, and wherein the one or more energy measurements obtained include the energy computed for each frequency bin of the set of frequency bins.

14. The apparatus of claim 13, wherein the instructions are further executable by the processor to cause the UE to:
    perform an average across the time domain to compute the energy in each frequency bin of the set of frequency bins over a symbol period of the set of symbol periods.

15. The apparatus of claim 13, wherein each frequency bin of the set of frequency bins comprises the subset of the set of subcarriers.

16. The apparatus of claim 13, wherein:
each frequency bin of the set of frequency bins are disjoint in time.

17. The apparatus of claim 12, wherein the instructions are further executable by the processor to cause the UE to:
perform a fast Fourier transform of the second plurality of signal samples to identify a set of frequency bins;
identify one or more frequency bins corresponding to a center frequency and bandwidth for the global synchronization channel number; and
determine that an energy of a first frequency bin is less that an energy of a second frequency bin, wherein identifying the energy pattern corresponding to the synchronization signal block and the comparison of the one or more energy measurements is based at least in part on determining the energy of the first frequency bin and the energy of the second frequency bin, the one or more energy measurements comprising the energy of the first frequency bin and the energy of the second frequency bin.

18. The apparatus of claim 17, wherein the second frequency bin corresponds to a symbol period of the set of symbol periods.

19. The apparatus of claim 11, wherein the energy pattern corresponding to the synchronization signal block spans across for consecutive symbol periods.

20. The apparatus of claim 11, wherein the set of symbol periods comprises an orthogonal frequency-division multiplexing symbol and the portion of each symbol period of the set of symbol periods comprises an eighth of the orthogonal frequency-division multiplexing symbol.

21. An apparatus for wireless communication at a user equipment (UE), comprising:
means for receiving a downlink signal comprising a synchronization signal block at a frequency corresponding to a global synchronization channel number, the synchronization signal block spanning across a set of symbol periods in time domain and a set of subcarriers in frequency domain;
means for analyzing a portion of each symbol period of the set of symbol periods in the time domain across a subset of the set of subcarriers in the frequency domain, wherein analyzing the portion of each symbol period comprises obtaining one or more energy measurements during the portion of each symbol period;
means for identifying an energy pattern corresponding to the synchronization signal block based at least in part on a comparison of the one or more energy measurements obtained from the analyzing; and
means for establishing a connection with a network entity based at least in part on the identified energy pattern.

22. The apparatus of claim 21, further comprising:
means for receiving the downlink signal comprising a first plurality of signal samples at a first frequency; and
means for buffering a second plurality of signal samples, wherein the first plurality of signal samples is greater than the second plurality of signal samples.

23. The apparatus of claim 22, further comprising:
means for performing a fast Fourier transform of the second plurality of signal samples to identify a set of frequency bins; and
means for computing an energy for each frequency bin of the set of frequency bins, wherein identifying the energy pattern corresponding to the synchronization signal block is based at least in part on computing the energy for each frequency bin, and wherein the one or more energy measurements obtained include the energy computed for each frequency bin of the set of frequency bins.

24. The apparatus of claim 23, further comprising:
means for performing an average across the time domain to compute the energy in each frequency bin of the set of frequency bins over a symbol period of the set of symbol periods.

25. The apparatus of claim 23, wherein:
each frequency bin of the set of frequency bins comprises the subset of the set of subcarriers.

26. The apparatus of claim 23, wherein:
each frequency bin of the set of frequency bins are disjoint in time.

27. The apparatus of claim 22, further comprising:
means for performing a fast Fourier transform of the second plurality of signal samples to identify a set of frequency bins;
means for identifying one or more frequency bins corresponding to a center frequency and bandwidth for the global synchronization channel number; and
means for determining that an energy of a first frequency bin is less that an energy of a second frequency bin, wherein identifying the energy pattern corresponding to the synchronization signal block and the comparison of the one or more energy measurements is based at least in part on determining the energy of the first frequency bin and the energy of the second frequency bin, the one or more energy measurements comprising the energy of the first frequency bin and the energy of the second frequency bin.

28. A non-transitory computer-readable medium storing code for wireless communication at a user equipment (UE), the code comprising instructions executable by at least one processor to:
receive a downlink signal comprising a synchronization signal block at a frequency corresponding to a global synchronization channel number, the synchronization signal block spanning across a set of symbol periods in time domain and a set of subcarriers in frequency domain;
analyze a portion of each symbol period of the set of symbol periods in the time domain across a subset of the set of subcarriers in the frequency domain, wherein analyzing the portion of each symbol period comprises obtaining one or more energy measurements during the portion of each symbol period;
identify an energy pattern corresponding to the synchronization signal block based at least in part on a comparison of the one or more energy measurements obtained from the analyzing; and
establish a connection with a network entity based at least in part on the identified energy pattern.

29. The non-transitory computer-readable medium of claim 28, wherein the instructions are further executable by the processor to:
receive the downlink signal comprising a first plurality of signal samples at a first frequency; and
buffer a second plurality of signal samples, wherein the first plurality of signal samples is greater than the second plurality of signal samples.

30. The non-transitory computer-readable medium of claim 29, wherein the instructions are further executable by the processor to:
perform a fast Fourier transform of the second plurality of signal samples to identify a set of frequency bins; and compute an energy for each frequency bin of the set of frequency bins, wherein identifying the energy pattern corresponding to the synchronization signal block is based at least in part on computing the energy for each frequency bin, and wherein the one or more energy measurements obtained include the energy computed for each frequency bin of the set of frequency bins.

\* \* \* \* \*